United States Patent
Haufe et al.

(10) Patent No.: US 7,615,306 B2
(45) Date of Patent: Nov. 10, 2009

(54) MEMBRANE ELECTRODE ASSEMBLY FOR A FUEL CELL

(75) Inventors: Stefan Haufe, Goettingen (DE); Annette Reiche, Goettingen (DE); Suzana Kiel, Goettingen (DE); Ulrich Maehr, Berlin (DE); Dieter Melzner, Goettingen (DE)

(73) Assignee: Elcomax Membranes GmbH, Munich (DE)

( * ) Notice: Subject to any disclaimer, the term of this patent is extended or adjusted under 35 U.S.C. 154(b) by 401 days.

(21) Appl. No.: 11/605,464

(22) Filed: Nov. 29, 2006

(65) Prior Publication Data

US 2007/0072045 A1    Mar. 29, 2007

Related U.S. Application Data

(63) Continuation of application No. PCT/EP2005/006025, filed on Jun. 4, 2005.

(30) Foreign Application Priority Data

Jun. 10, 2004   (DE) ................. 10 2004 028 141

(51) Int. Cl.
    *H01M 2/08*  (2006.01)
    *H01M 8/10*  (2006.01)
(52) U.S. Cl. .......................... 429/35; 429/33

(58) Field of Classification Search ........... 429/35, 429/30, 33, 32
     See application file for complete search history.

(56) References Cited

U.S. PATENT DOCUMENTS

| 5,464,700 | A |   | 11/1995 | Steck et al. |
| 5,525,436 | A | * | 6/1996 | Savinell et al. .............. 429/30 |
| 5,578,388 | A |   | 11/1996 | Faita et al. |
| 6,387,557 | B1 |  | 5/2002 | Krasij et al. |
| 2004/0091767 | A1 | | 5/2004 | Zuber et al. |

FOREIGN PATENT DOCUMENTS

EP   1 403 949 A1   3/2004

* cited by examiner

*Primary Examiner*—Patrick Ryan
*Assistant Examiner*—Thomas H. Parsons
(74) *Attorney, Agent, or Firm*—Sughrue Mion, PLLC

(57) ABSTRACT

A membrane electrode assembly (MEA) for a fuel cell, which has a planar polymer membrane. This membrane, in a tangentially inner area, is coated on both sides with electrode structure, and, in a tangentially outer area projecting at least on one side beyond the electrode structure coating, is connected to a sealing member. A marginal zone of the polymer membrane is embedded in the elastomer sealing member. The sealing member extends tangentially inward to a transition area that lies tangentially between the outer area and the inner area, where it overlaps the electrode structures on outer faces of the electrode structures, on both of the sides of the polymer membrane.

15 Claims, 1 Drawing Sheet

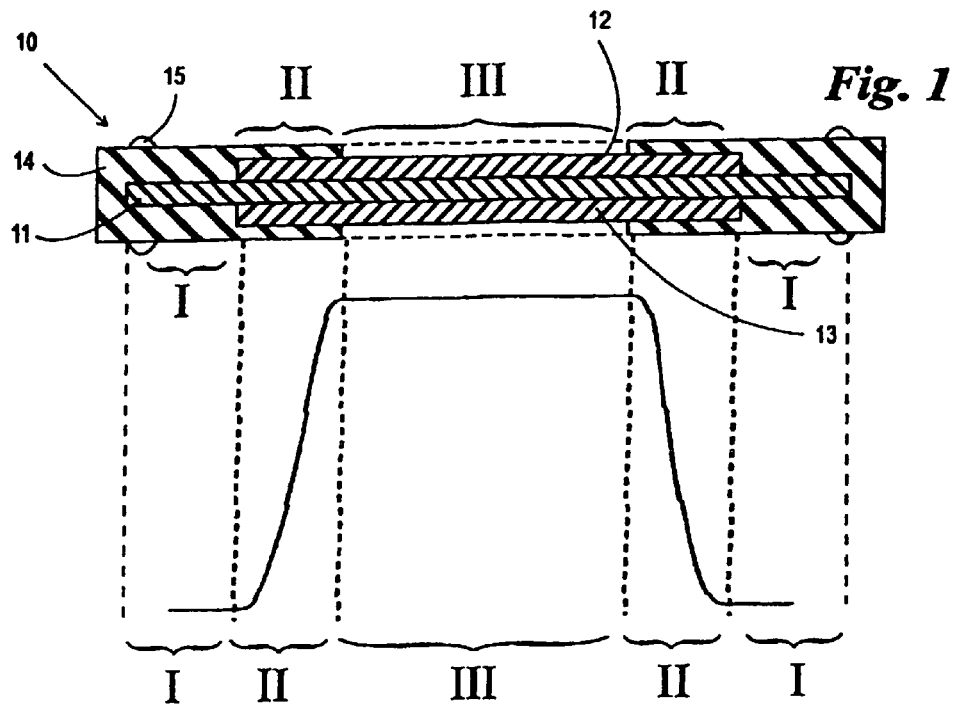
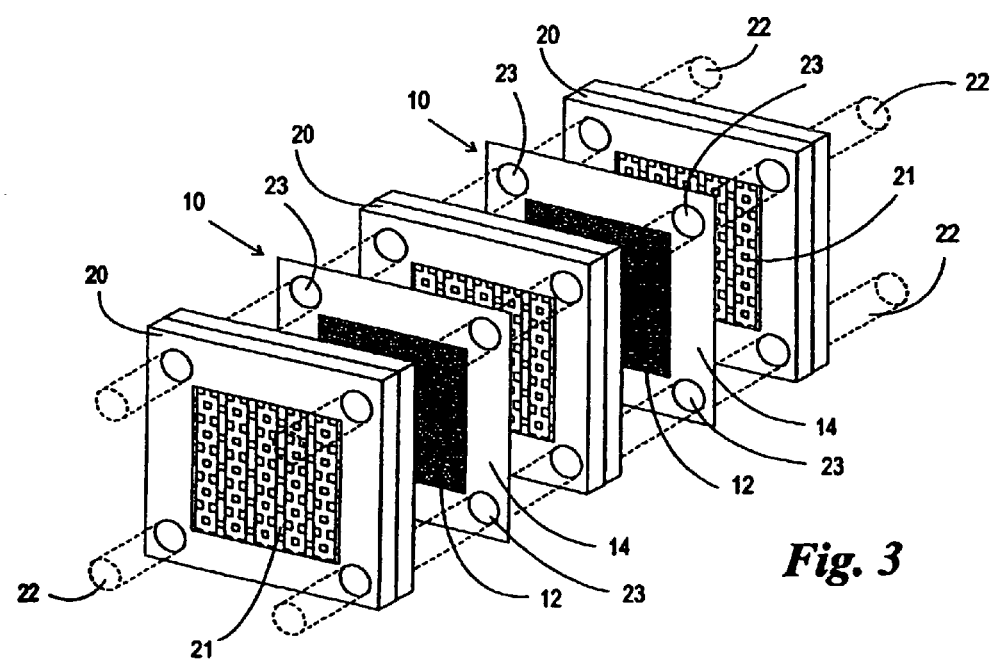

MEMBRANE ELECTRODE ASSEMBLY FOR A FUEL CELL

This is a Continuation of International Application PCT/EP2005/006025, with an international filing date of Jun. 4, 2005, which was published under PCT Article 21(2) in German, and the disclosure of which is incorporated into this application by reference.

FIELD AND BACKGROUND OF THE INVENTION

The invention relates to a membrane electrode assembly (MEA) for a fuel cell having a planar polymer membrane, which, in a tangentially inner area, is coated with electrode structure on both sides and, in a tangentially outer area projecting on at least one side beyond the electrode structure coating, is connected to a sealing member.

The invention further relates to a fuel cell stack having a plurality of membrane electrode assemblies arranged between separator plates (bipolar or monopolar separators). Each MEA has a planar polymer membrane, which in a tangentially inner area is coated with electrode structure on both sides and which has a tangentially outer area projecting beyond the electrode structure.

Various types of fuel cells are known in the art. Specifically, in so-called polymer electrolyte membrane fuel cells (PEMFCs), a proton conducting membrane is provided, which is contacted by electrodes on both sides. The electrodes conventionally include a catalytically active layer that is formed of, for example, platinum-coated carbon, which is in direct contact with the membrane, and porous electron conducting structures to transport the reaction gases to the catalytically active layer. These latter structures are usually referred to as gas diffusion structures. They may be formed of, for example, porous carbon paper, carbon fabric or carbon nonwoven material.

To operate the fuel cell, hydrogen gas or a hydrogen-containing gas is delivered to the electrode acting as the anode. The precise composition of the gas depends on the special character of the rest of the fuel cell. At the same time, oxygen gas or an oxygen-containing gas is delivered to the second electrode acting as the cathode. The aforementioned gases are hereinafter referred to as "reaction gases."

The hydrogen is catalytically oxidized at the anode:

$$H_2 \rightarrow 2H^+ + 2e^-.$$

The electrons released as a result are discharged to the consumer through the electrode, and the protons thus created migrate through the electrolyte to the cathode side where they are converted with oxygen to give water. The required electrons are supplied through the electrode:

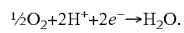

$$\tfrac{1}{2}O_2 + 2H^+ + 2e^- \rightarrow H_2O.$$

In the PEMFC, for example, the charge transfer through the electrolyte occurs through migration of $H_3O^+$ ions and/or proton hopping processes. To achieve this, most of the polymer membranes employed must be doped with a doping agent. A frequently used doping agent is, for example, phosphoric acid ($H_3PO_4$). Other membranes become adequately ion conductive by absorbing water.

However, doping causes polymer membranes to swell and lose their stability. This makes further handling of the membranes extremely difficult.

For example, mounting a sealing member in the marginal zone of the polymer membrane, which is particularly advantageous for the construction of a fuel cell stack, becomes difficult. The Japanese publication JP 03331873 A1, which discloses a generic MEA, describes a way to circumvent this problem. In the MEA disclosed in that document, the outer area of the polymer membrane lacks electrode structure on one side only. In other words, the electrode structure on the other side of the polymer membrane extends to the margin of the membrane covering also the marginal zone. This produces sufficient stability of the MEA, so that its bare areas can be firmly bonded to a sealing member. The unstable polymer membrane is thus stabilized by the electrode structure, which extends outwardly far beyond the actual electrochemically active inner area of the MEA. This measure has several drawbacks. On the one hand, the enlargement of the electrode area is costly because the electrode material, e.g., platinum coated carbon, is expensive. Secondly, the otherwise desirable goal to use the thinnest possible electrode layer is strictly limited by the increased stability requirements for the electrode layer. Finally, this constellation is also unfavorable electrochemically because the active area of the MEA is not precisely defined. Rather, it extends over a substantially greater area on one side of the polymer membrane than on the other, which can cause problems with ion transport and crossflows.

As an alternative to mounting a sealing member to the MEA itself it is also known to arrange sealing material on the separator plates of a fuel cell stack and to dispose highly flexible, doped MEAs whose polymer membranes are uncoated in the marginal zone on both sides between the separator plates in such a way that the protruding membrane areas interact with the sealing material. A generic fuel cell stack of this type is disclosed in the German publication DE 101 21 176. German publication DE 102 51 439 A1 also discloses a corresponding fuel cell stack. A drawback, however, is the complexity of the stack construction because of the need for additional sealing material and the difficulty of handling the mechanically highly sensitive MEAs.

SUMMARY OF THE INVENTION

It is an object of the present invention to further refine a generic MEA such that its stability can be increased and the thickness of the electrode coating minimized in order to lower the manufacturing costs.

This object is attained by providing a membrane electrode assembly comprising a planar polymer membrane which, in a tangentially inner area, is coated with electrode structure on both sides and, in a tangentially outer area, is connected to a sealing member that projects on at least one side beyond the electrode structure. In the membrane electrode assembly, a marginal zone of the polymer membrane is embedded in the elastomer sealing material, such that the sealing member extends tangentially inwardly into a transition area that lies tangentially between the outer area and the inner area, where it overlaps the electrode structures on outer faces of the electrode structures, on both of the sides of the polymer membrane.

A further object of the apparatus according to the invention is to further refine a generic fuel cell stack so as to simplify its construction.

This object is attained by providing a fuel cell stack comprising a plurality of membrane electrode units (MEAs) which are each disposed between separator plates. Each MEA comprises a planar polymer membrane which, in a tangentially inner area, is coated with electrode structure on both sides and which has a tangentially outer area projecting beyond the electrode structure coating. A marginal zone of each polymer membrane is embedded into a sealing member made of an elastomer material and forms a bond therewith, such that the sealing member extends tangentially inwardly into a transition area that lies tangentially between the outer area and the inner area, where it overlaps the electrode structures on outer faces of the electrode structures, on both of the sides of the polymer membrane.

The effects and advantages of the invention will now be discussed for both the MEAs according to the invention and the fuel cell stack according to the invention.

According to the invention, the stabilization function is assumed by the elastomer sealing member into which the marginal zone of the polymer membrane is embedded. However, the sealing member extends tangentially inwardly far enough that it overlaps the marginal zone of the electrode structures on both sides of the polymer membrane. Preferably, the sealing member extends tangentially inwardly far enough that it slightly overlaps the marginal zone of the electrode structures on both sides of the polymer membrane. This ensures a reliable transition between the inner area of the MEA stabilized by the electrode, which also corresponds to its electrochemically active area, and the outer area of the MEA stabilized by the sealing member.

Particularly advantageous embodiments of the invention are set forth below.

The sealing member encloses the inner area of the polymer membrane. Preferably, the sealing member frames the inner area of the polymer membrane. This creates a sealing MEA that is dimensionally stable and can therefore be easily installed between the separator plates when a fuel cell stack is constructed. It also makes it possible to eliminate additional sealing materials.

Particularly preferably, the elastomer material is cast onto the polymer membrane. Other joining methods may also be used, however, such as bonding, welding or hot pressing.

The invention, in a preferred embodiment, provides that the inner area of the polymer membrane and the transition area be doped with a doping agent such that the concentration of the doping agent decreases tangentially outwardly in the transition area. With the decrease in the concentration of the doping agent, the proton conductivity decreases in outward direction while the mechanical stability of the polymer membrane increases. The manufacture of the MEA according to the invention can thus be substantially simplified. If doping is carried out even before the sealing member is mounted, the outer area of the membrane to be embedded into the sealing member is quite stable so that handling during the embedding process, particularly injection of the elastomer material around the membrane, presents no particular difficulties. In another embodiment, doping of the membrane can be done through the electrodes after the sealing member has been applied. The polymer membrane is preferably formed of polybenzimidazole.

The doping agent preferably contains phosphoric acid ($H_3PO_4$).

When the MEAs according to the invention are installed in a fuel cell stack, any unevennesses of the individual elements can be compensated because of the elastic properties of the elastomer material. Furthermore, to prevent excessive compression of the MEA during pressing of the fuel cell stack, a particularly preferred embodiment of the invention provides for spacer structures that are non-elastic compared to the elastomer material to be embedded into the sealing member. These structures counteract any excessive compression of the sealing member without, however, excessively impairing its compensating elastic properties. Webs or bars formed of metal, plastic or carbon, which are substantially stiffer than the elastomer material, may be used, for example. Corresponding spacer structures may also be integrated into the separator plates.

Another preferred further refinement of the invention provides that the polymer membrane and the sealing member be provided with openings in their outer area for the conduction of reaction gases or cooling medium. Such openings, which communicate with corresponding openings in the separator plates, may be used as gas or fluid channels that extend axially through the fuel cell stack so that reaction gas and/or cooling medium do not have to be delivered separately to each individual cell of the stack.

Preferably, the sealing member has external sealing structures for providing sealing interaction with neighboring elements in a fuel cell stack. These structures may be sealing lips or sealing grooves, for example. They can, for example, enclose the electrochemically active inner area of the MEA like a frame to prevent the reaction gas delivered through the electrodes from escaping to the outside. If the openings provided for conducting the gas or fluid penetrate the membrane and the sealing member, such sealing structures can enclose the openings approximately annularly to prevent the conducted gas or fluid from escaping.

BRIEF DESCRIPTION OF THE DRAWINGS

The invention will now be described in greater detail with reference to the attached drawings, in which:

FIG. 1 is a schematic cross sectional view of an MEA according to the invention;

FIG. 2 is a schematic diagram showing the doping concentration across the extension of the MEA of FIG. 1; and FIG. 3 is a schematic diagram of a fuel cell stack using the MEAs according to the invention.

DETAILED DESCRIPTION OF THE PREFERRED EMBODIMENTS

FIG. 1 is a schematic cross sectional view illustrating the individual elements and areas of an MEA 10 according to the invention. The core of the module is the actual MEA, consisting of the polymer membrane 11 and the electrode structures 12 and 13 applied each to one side of the polymer membrane 11, respectively. In an outer area I (see also FIG. 2), the membrane 11 projects beyond the electrode structure coating 12, 13. In this area it is embedded into and forms a bond with a frame 14 made of an elastomer material. Embedding is preferably done by injection molding or casting. An inner area III of the MEA 11, 12, 13, which also corresponds to the electrochemically active area of the MEA, is free from the elastomer material of the frame 14. The delivery of the reaction gas to the electrode structures 12, 13, the catalytic reaction and the ion transport through the membrane 11 occur in this area.

In a transition area II, the marginal zones of the electrode structures 12, 13 are embedded into and form a bond with the elastomer frame 14.

FIG. 2 illustrates the concentration distribution of a doping agent, e.g., phosphoric acid, in its spatial distribution across the different areas I, II and III. In the active area III, the concentration is particularly high. In this area, the ion transport through the membrane 11 must be ensured. In the outer areas I, on the other hand, the membrane 11 is preferably undoped because in these areas the membrane 11 is self-supporting at least before it is embedded into the elastomer frame 14. If doped in this area, the membrane would lose much of its mechanical stability, which would make handling more difficult. Thus, in the preferred embodiment depicted in FIG. 2, the concentration of the doping agent decreases tangentially outwardly in the transition area II, particularly from the maximum concentration in the active area III to zero in the outer area I. In the transition area II, practically no electrochemical reaction occurs because no reaction gas can be delivered through the sealing elastomer frame in this area. Only in an area near the boundary to the active area III, where reaction gas can still diffuse into the transition area II through the electrode structures 12, 13, can the electrochemical reaction still take place (with tangentially outwardly decreasing intensity). As the concentration decreases tangentially outwardly, the stability of the membrane 11 increases. Because the membrane 11 is stabilized in this area by both the electrode structures 12 and 13 and parts of the elastomer frame 14, the assembly 10 as a whole is stable and easy to handle.

In the embodiment shown in FIG. 1, in the outer marginal zone of the elastomer frame 14, sealing lips 15 are disposed on the external side and interact with adjacent structures to form a seal when the elastomer assembly 10 is installed in a fuel cell stack.

A schematic example of a fuel cell stack is depicted in FIG. 3. Here, MEAs 10 are placed between bipolar plates 20 which in their inner area 21, corresponding to the active area III of the MEAs, have channel structures through which reaction gas is delivered via the electrodes 12 and 13 (the latter are not visible in FIG. 3). FIG. 3 also shows gas or fluid channels 22 which axially penetrate the fuel cell stack. As in the exemplary embodiment of FIG. 3, they are preferably disposed in the outer area I of the MEAs, which have corresponding openings 23. The transport of reaction gases and/or cooling medium along the axis of the stack is ensured by the sealing action of the elastomer frame 14, advantageously supported by sealing structures such as sealing lips, for example (not shown in FIG. 3).

The depicted and specially described embodiments of the invention are of course only examples given by way of illustration. It will be understood by those of ordinary skill in the art that various changes in form and details may be made therein without departing from the spirit and scope of the present invention as defined by the following claims. For example, with regard to the selection of the material for the elastomer frame, the person skilled in the art has a broad spectrum of materials to choose from. The following non-exhaustive list of materials are suitable for forming the elastomer frame 14 according to the invention because of their excellent heat resistance, among other characteristics: ethylene propylene diene rubber, silicone rubber, fluorosilicone rubber, fluorene rubber, fluorocarbon rubber and perfluorinated rubber. It is sought, therefore, to cover all such changes and modifications as fall within the spirit and scope of the invention, as defined by the appended claims, and equivalents thereof.

What is claimed is:

1. A membrane electrode assembly for a fuel cell, comprising:
    a planar polymer membrane which, in a tangentially inner area, is coated with respective electrode structures on either side and, in a tangentially outer area that projects on at least one side beyond the electrode structures, is connected to a sealing member formed of elastomer material, wherein:
    a marginal zone of the polymer membrane is embedded into the sealing member,
    the sealing member extends tangentially inwardly into a transition area that lies tangentially between the outer area and the inner area, and overlaps the electrode structures on outer faces of the electrode structures, on both of the sides of the polymer membrane, and
    the inner area of the polymer membrane and the transition area are doped with a doping agent, such that the concentration of the doping agent decreases tangentially outwardly in the transition area.

2. The membrane electrode assembly as claimed in claim 1, wherein the sealing member frames the entire inner area of the polymer membrane tangentially outwardly.

3. The membrane electrode assembly as claimed in claim 1, wherein the elastomer material is cast onto the polymer membrane.

4. The membrane electrode assembly as claimed in claim 1, wherein the doping agent contains phosphoric acid ($H_3PO_4$).

5. The membrane electrode assembly as claimed in claim 1, wherein the polymer membrane is formed of polybenzimidazole.

6. The membrane electrode assembly as claimed in claim 1, wherein spacer structures, which are non-elastic compared to the elastomer material of the sealing member, are embedded into the sealing member.

7. The membrane electrode assembly as claimed in claim 1, wherein the polymer membrane and the sealing member have openings in the outer area for reaction gases or cooling medium to pass through.

8. The membrane electrode assembly as claimed in claim 1, wherein the sealing member has sealing structures disposed on the exterior of the sealing member, and is configured to interact with adjacent elements in a fuel cell stack, to form a seal.

9. A fuel cell stack, comprising a plurality of membrane electrode units which are each disposed between separator plates,
    wherein each membrane electrode unit comprises a planar polymer membrane which, in a tangentially inner area, is coated with respective electrode structures on either side and which has a tangentially outer area projecting beyond the electrode structure coating,
    wherein a marginal zone of each polymer membrane is embedded into and forms a bond with a sealing member formed of an elastomer material, and the sealing member extends tangentially inwardly into a transition area that lies tangentially between the outer area and the inner area, where the sealing member overlaps the electrode structures on outer faces of the electrode structures, on both of the sides of the polymer membrane, and
    wherein the inner areas of the plurality of polymer membranes and the respective transition areas are doped with a doping agent, such that the concentration of the doping agent decreases tangentially outwardly in the transition areas.

10. The fuel cell stack as claimed in claim 9, wherein the sealing member frames the entire inner area of the polymer membrane tangentially outwardly.

11. The fuel cell stack as claimed in claim 9, wherein the elastomer material is cast onto the polymer membrane.

12. The fuel cell stack as claimed in claim 9, wherein the doping agent contains phosphoric acid ($H_3PO_4$).

13. The fuel cell stack as claimed in claim 9, wherein the polymer membranes are formed of polybenzimidazole.

14. The fuel cell stack as claimed in claim 9, wherein spacer structures, which are non-elastic compared to the elastomer material of the sealing member, are embedded into each sealing member.

15. The fuel cell stack as claimed in claim 9, further comprising:
    channels for conducting at least one of reaction gases and a cooling medium, wherein the channels axially extend through the fuel cell stack in an area corresponding to the outer area of the polymer membranes, such that each sealing member has sealing structures that enclose each channel that penetrates the sealing member and that interact with an adjacent one of the separator plates, to form a seal.

* * * * *